(No Model.)
W. BUNTING, Jr.
WATER CLOSET.
No. 325,587. Patented Sept. 1, 1885.
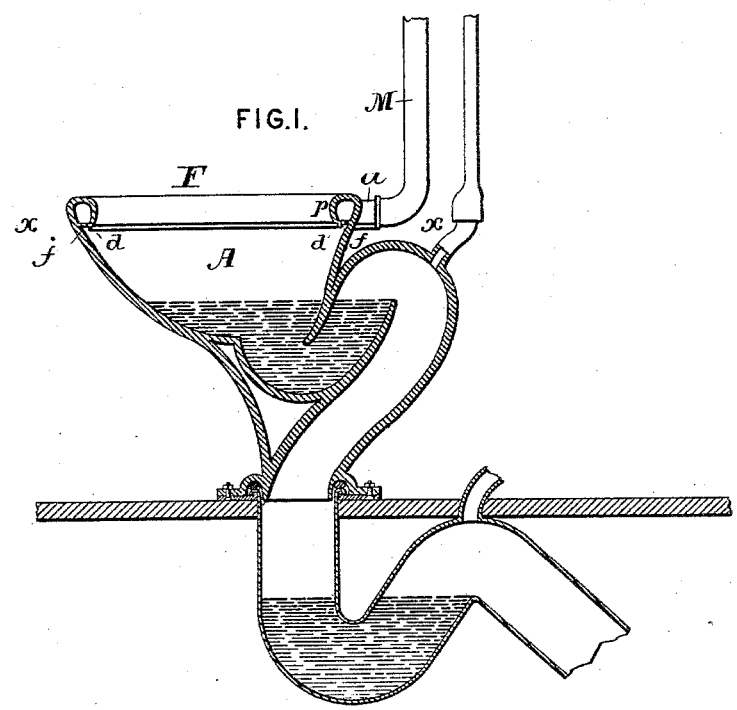
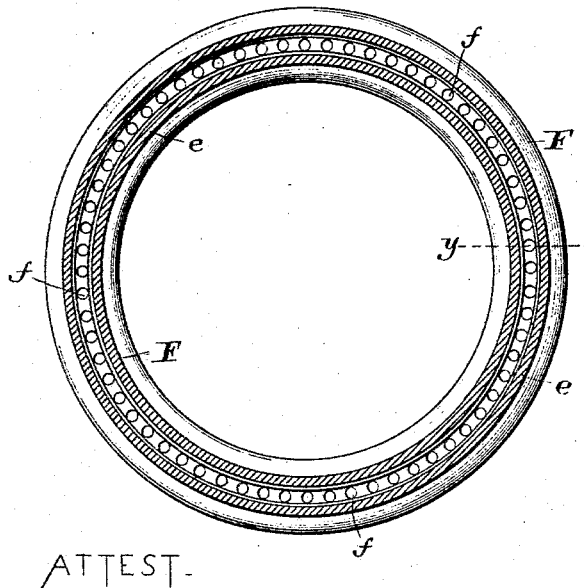
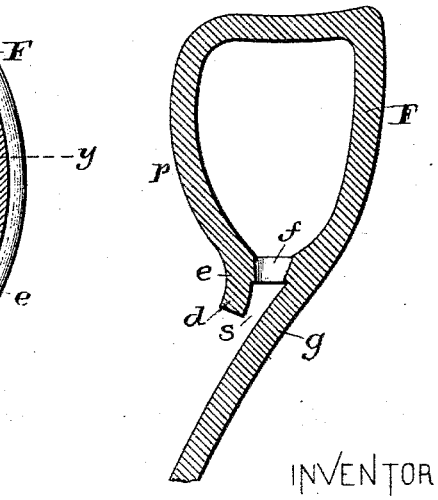
ATTEST-
J. Henry Kaiser.
Jacob Felbel.
INVENTOR-
William Bunting Jr.
By J. N. M. Lutrie
Atty.

UNITED STATES PATENT OFFICE.

WILLIAM BUNTING, JR., OF BOSTON, MASSACHUSETTS, ASSIGNOR TO THE MEYER, SNIFFEN COMPANY, (LIMITED,) OF NEW YORK, N. Y.

WATER-CLOSET.

SPECIFICATION forming part of Letters Patent No. 325,587, dated September 1, 1885.

Application filed February 24, 1885. (No model.)

*To all whom it may concern:*

Be it known that I, WILLIAM BUNTING, Jr., of Boston, in the county of Suffolk and State of Massachusetts, have invented certain new and useful Improvements in Water-Closets; and I do hereby declare that the following is a full, clear, and exact description thereof, reference being had to the accompanying drawings, making part of this application.

My invention relates to a new and useful improvement in that kind of water-closet bowls or basins in which a flushing-rim is used, located at or near the upper edge of the bowl, and formed, as usual, integrally with said bowl.

Previous to my invention the flushing-rims of such closet-bowls have been made in a variety of ways, some having been formed with a series of apertures at the lower part of the hollow annular rim of the bowl that were arranged about equidistant and of equal discharge capacity, others having discharge-apertures of different sizes at different portions of the rim's contour, and others still having continuous slit-like openings all around the lower part of the rim, to effect the discharge of a thin sheet-like spray of water; but in all the constructions that I know of there are some objections affecting either a successful operation of the flushing-rim with an economic use of water, or a ready and economic manufacture of the bowl, or both. The bowl with its flushing-rim, be the structure of the latter what it may, is made, as is well known, of earthenware or a sort of porcelain, so that in its manufacture some peculiarities of construction may be found to be impractical.

To illustrate, on account of the frequently uneven or irregular shrinkage and the warping out of the designed shape of portions of the bowl's material in the baking process, any construction requiring perfect precision is wholly impracticable, because the spoiling of many of the bowls by the failure merely of the articles to all come out finished in the precise forms intended would render the practicing of such construction too expensive.

In that form of flushing-rim in which the lowermost part or bottom of the sort of annular hollow device is perforated with a series of round, square, or oblong apertures, be they either of uniform or varying capacities, and of either equal or unequal distances apart, there are two serious objections or defects— viz., in the first place, a material part of the water discharged from such flushing-rim is thrown therefrom toward the middle of the bowl or away from the vicinity of the side walls of the basin, and so as not to wash down the said walls, though it is always most desirable that all the flushing-water should descend in contact with the side wall of the bowl, not only to insure a perfect washing of said walls, but also to induce a sort of scouring out of the bottom portion of the basin and swabbing or slushing out of the standing water and its excrementitious contents, (this is especially important in all "side-delivery" and "water-surface" closets;) and, in the second place, a series of separate jets of water, no matter how disposed round about the upper part of the bowl's contour, will not usually operate to cleanse the bowl as thoroughly as will an annular sheet of water descending in contact with all parts of the interior surface of the bowl.

In that form of flushing-rims in which there is a continuous slit-like opening at the lowermost part of the hollow annular rim it has been found quite impracticable to cast and complete the manufacture of the (earthenware) article without more or less impairment in the designed size and shape of said continuous slit-like discharge-opening, this annular opening in the finished article of manufacture being often too wide at some points and too narrow at others to permit a proper water-discharge to all parts of the bowl's walls.

It has been attempted to overcome this vital defect in this species of flushing-rim by casting the rim with stay-pieces here and there, thus breaking the continuity of the proposed slit-like or continuous annular discharge-opening; but unless such stays be put in frequently enough to virtually transform the rim into the other type of construction the practical difficulty just alluded to cannot be fully overcome.

I propose to provide for use a flushing-rim which, while it shall present a construction by means of which a perfectly continuous or annular sheet of water will be discharged wholly against the descending walls or interior surface of the bowl, shall also be of such structure that no difficulty whatever will be encountered in the manufacture of the article out of the usual earthen material by the commonly praticed processes of making bowls of such material, but on the contrary all the articles made will be comparatively perfect in shape, and operate precisely as designed.

To this main end and object my invention may be said to consist in the hereinafter more fully explained construction of flushing-rim, the essential feature of which novel structure lies in having the rim formed with a perforated bottom, and also with a downward extension or depending lip-like portion at its inner side, which lip-like extension operates to transform the numerous separate jets of water discharged from the interior of the rim into one sheet-like annular stream and force the latter to descend in contact with the side walls of the basin.

To enable those skilled in the art to which my invention relates to make and use my invention I will now proceed to more fully explain it, referring by letters to the accompanying drawings, which form part of this specification, and in which I have shown my invention carried out in that form in which I have so far successfully practiced it.

In the drawings, Figure 1 is a partial vertical section of a water-closet having a bowl provided with one of my improved flushing-rims. Fig. 2 is a horizontal section on a somewhat enlarged scale at the line $xx$ of Fig. 1, and looking upwardly, so as to view the bottom part of the rim. Fig. 3 is a detail partial vertical section at the line $yy$ of Fig. 2, on a still larger scale to better show the construction.

In the several figures the same part will be found designated by the same letter of reference.

A is the bowl, and F the flushing-rim, molded integrally therewith in the usual manner. The rim F is about the usual size and shape except as to its lowermost portion, (the peculiar structure of which will be presently explained,) and receives its supply of water in the case shown from the nozzle $a$, connected with the lower end of a supply-pipe, M, that extends upwardly to a tank or other supply source. The rim F is made, as shown, in the form of a sort of annular tube extending all round the upper edge of the bowl A, and has its bottom $e$ (see Figs. 2 and 3) perforated with a series of holes, $f$, which may be of any shape, but which are shown as round, and which should be close enough together and of such size that their aggregate capacity will a little more than equal the area or discharge capacity of the annular slit-like opening $s$, which exists (below the locality of this perforated bottom $e$) between the upper part of the side wall, $g$, of the bowl A (see Fig. 3) and the depending lip-like extension $d$ of the inner wall, $p$, of the rim F. The object of having the discharge capacity of this annular discharge-orifice $s$ slightly less than that of the aggregation of apertures $f$ in the bottom of the rim is that the contents of the rim F (which, as usual, is suddenly filled with water under pressure) may pass through the series of holes $f$ at such a rate (or in such quantity) as to amply supply the annular orifice $s$ through which the water makes its final escape from the flushing-rim in a continuous sheet, and thus cause the water to descend in an unbroken and ample supply over every part of the interior surface of the side walls of the bowl.

The shape of the depending lip $d$ and its relative arrangement to the inner surface of the wall $g$ are such, as shown, that the sheet of water escaping through the space $s$ will be deflected against or be caused to descend wholly against the interior surface of $g$, thus avoiding any such waste of flushing water as must occur in the use of any rim from which the water spreads or sprays out toward the middle of the bowl A in escaping from the flushing-rim.

As the hollow or tubular rim F, although full of perforations at its bottom, presents a continuous wall in cross section at all points intermediate of the perforations, there is no practical difficulty in casting or baking such rim so that its final form will always be substantially perfect, and as the lip-like device $d$, by means of which I produce the supplemental annular or slit-like discharge-orifice $s$, is comparatively short, and is merely a slight downward extension of the inner wall, $p$, of the rim (that is practically of a tubular form in cross-section) there is no practical difficulty in making the earthenware article with this orifice $s$ always of substantially the predetermined size and shape throughout its entire extent.

In the operation of a closet-bowl made as herein shown and described, a minimum amount of water will produce the most desirable results, since all the water supplied to the rim F will be discharged in an annular sheet perfectly deflected against the side walls of the bowls, so as to perfectly wash them down and so as also to slush out the contents of the bowl, and hence the great desideratum of a perfect flushing of the bowl with the least amount of water is accomplished.

At the same time the novel construction by which these desirable ends are accomplished is one which involves no practical difficulties in the manufacture of earthenware bowls embodying such peculiarities of structure as I have described.

The essential features of the novel construction are, of course, the continuous orifice $s$, formed by the side wall, $g$, and the depending lip $d$, and a hollow rim, F, perforated at its bottom so as to supply the water in the manner explained to the final discharge-orifice s, and so long as these essentials be employed so as to produce the effects described, the forms of parts and details of structure may be modified without departing from the spirit of my invention.

Having now so fully explained my improved construction of water-closet-bowl flushing-rims that any skilled person can make and use my invention, what I claim as new, and desire to secure by Letters Patent, is—

A bowl or basin formed or provided with a flushing-rim, F, having a perforated bottom and a depending lip-like extension at d, whereby a final slit-like discharge-orifice, s, is formed, below the series of discharge-apertures in the bottom of the hollow rim F, all substantially as and for the purposes set forth.

In witness whereof I have hereunto set my hand this 26th day of December, 1884.

WILLIAM BUNTING, JR.

In presence of—
CHAS. H. EGLEE,
GEO. Z. HAMBLEN.